UNITED STATES PATENT OFFICE.

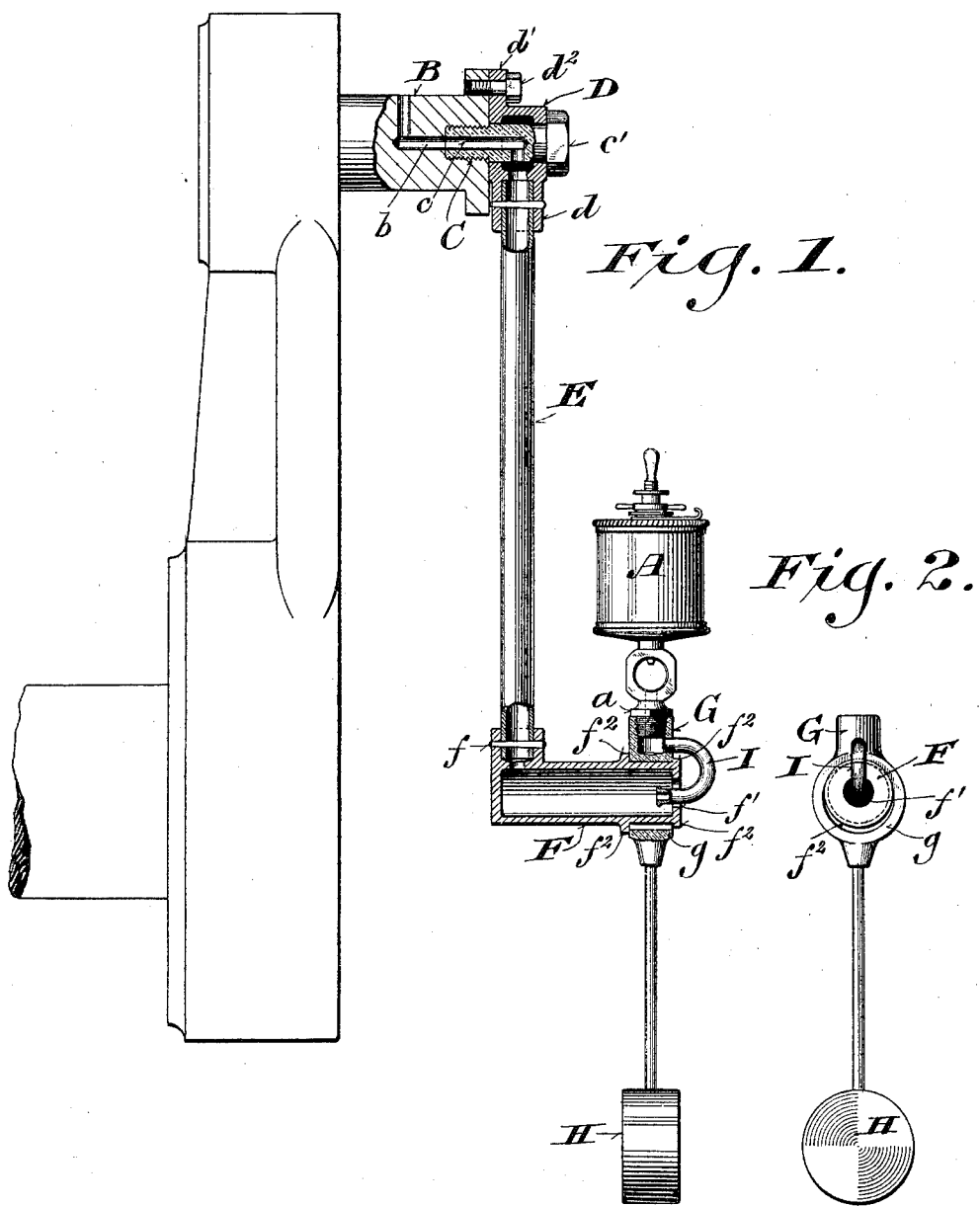

WILLIAM WASHBURN NUGENT, OF CHICAGO, ILLINOIS.

GRAVITY CENTER-OILER.

SPECIFICATION forming part of Letters Patent No. 626,291, dated June 6, 1899.

Application filed August 25, 1898. Serial No. 689,474. (No model.)

*To all whom it may concern:*

Be it known that I, WILLIAM WASHBURN NUGENT, a citizen of the United States, residing at Chicago, in the county of Cook and State of Illinois, have invented a certain new and useful Gravity Center-Oiler, of which the following is a specification, reference being had to the accompanying drawings, forming a part thereof.

My invention relates to that class of lubricators in which the oil-receptacle is supported in an upright position by a bearing concentric with the axis of rotation or oscillation of the bearing to be lubricated and in which the lubricant is supplied to the bearing through the end of the journal. Its main object is to provide a loose easily-working bearing for the support of the oil-cup, whereby the latter is prevented from being carried around with its revolving or oscillating support and at the same time to avoid leakage.

It consists of certain peculiarities of construction and arrangement of parts hereinafter particularly described, and pointed out in the claims.

In the accompanying drawings like letters designate the same parts in both figures.

Figure 1 is a partial elevation and section of my improved device applied to a crank or wrist pin bearing, the section being made in a plane cutting the crank-pin and the revolving support of the oil-cup axially; and Fig. 2 is an elevation of the oil-cup holder and support viewed in the direction of the axis of rotation.

A represents an ordinary sight-feed or any suitable form of oil-cup, preferably provided with the usual means for regulating the flow of oil therefrom and with a perforated screw-threaded plug $a$ for the attachment of the cup to the journal-box or part designed to carry it.

B represents a crank or wrist pin, in the end of which is formed a threaded socket for the reception and attachment of a tubular screw-threaded stud or bolt C. The passage $c$ in this stud communicates at its inner end with a passage $b$, formed in the crank-pin and leading to its bearing-surface, where the oil is to be delivered. The stud C is formed at its outer end with a head $c'$, and upon it, between its head and the end of the crank-pin B, is fitted and mounted a sleeve D, which has an annular recess inside communicating with the outer end of the passage $c$ in the stud C, and is formed on one side with a neck or socket $d$ and on the opposite side with an ear or flange $d'$, which is secured to the flange of the crank-pin B by a bolt or screw $d^2$.

E is a tubular arm fitted and pinned or otherwise fastened at one end in said neck or socket $d$ and extending therefrom in a radial direction toward the axis of the crank-shaft. The other end of said tubular arm is fitted and pinned or otherwise suitably fastened in a radial neck or socket $f$ of a tubular or hollow journal or bearing F, which constitutes the support for the oil-cup A. This journal, bearing, or support F is set with its axis in line with the axis of the crank-shaft and has at its outer end a central contracted aperture $f'$.

G represents the oil-cup holder, formed with a threaded socket in its upper end for the reception and attachment of the threaded plug $a$ at the base of the oil-cup. It is also formed with a box or collar $g$, which fits loosely over the cylindrical support F and is held thereon by outwardly-projecting flanges $f^2 f^2$. It is provided with a counterweight H below the support F for holding the oil-cup in an upright position. A bent tube I, secured at one end in the upper part of the holder F, is made to project loosely at its other end into the contracted aperture $f'$ in the end of the hollow support F and affords communication between the feeding-passage of said oil-cup and the passage in the connections leading to the crank-pin B. This tube may be conveniently formed from straight tubing by bending the same into the shape shown in the drawings and brazing or otherwise fastening one end in a lateral aperture in the outer side of the holder G, said aperture opening into the socket into which the plug $a$ of the oil-cup is screwed. The bore of the box or sleeve G is made of sufficient diameter to pass over the outer flange $f^2$, so as to admit of readily removing and replacing the holder, with the oil-cup, from and upon its support F.

To apply and adjust the oiler, the distance between the center of the crank-pin and the center of the crank-shaft is ascertained, and the tubular arm E is then cut to the required length to bring the axis of the holder F in line with the center of the crank-shaft. The stud C, with the sleeve D thereon, is screwed into the socket in the end of the crank-pin, and the tubular arm E is turned to bring the center of the support F into line with the center of the crank-shaft. When the parts have been thus properly assembled and centered, the hole for the bolt $d^2$ is drilled and tapped and the device is secured in place by said bolt.

The oiler operates as follows: The oil-cup A being supplied with oil and its feed adjusted to allow the oil to flow at the proper rate to the bearing to be lubricated, as the crank-pin or journal turns or oscillates the hollow support F will also turn or oscillate about the axis of rotation or oscillation of the main bearing; but the oil-cup will be held by its counterweight H in an upright position and the oil will flow therefrom through the feed-passage leading out of its base and the bent tube I into the hollow journal or support F, from which it will flow through the tubular arm E, plug C, and the passage $b$ in the crank or wrist pin to the surface to be lubricated whenever said crank or wrist pin passes below the hollow journal or bearing F or below the axis of rotation or oscillation.

Although I have for convenience of illustrating and describing the device shown it as applied to a crank-pin bearing, it may be applied to an ordinary journal by forming the support F thereon or attaching it to the end of such journal, in which case a passage is provided leading from the interior of the tubular or hollow support F to the bearing-surface of the journal to be lubricated.

Various changes in the details of constructing and arranging the parts of which my improved oiler is composed may be made without affecting its mode of operation or departing from the spirit of my invention.

I claim—

1. In a gravity center-oiler the combination with a suitable oil-cup of a chambered cylindrical support connected with the bearing to be lubricated and having an aperture concentric with the axis of rotation or oscillation, a holder loosely mounted upon said support and carrying the oil-cup and a conduit passing outside of the bearing of said holder into said aperture and constituting a loose connection between the feeding-passage of the oil-cup and said chambered support, substantially as and for the purposes set forth.

2. In a gravity center-oiler the combination of a suitable oil-cup, a hollow or tubular revolving or oscillating support connected with the bearing to be lubricated and provided with a central aperture in one end and formed with a cylindrical bearing-surface with outwardly-projecting flanges at each end thereof, a holder provided with a socket in its upper end for the reception and attachment of the stem or plug of the oil-cup and with a sleeve adapted to fit loosely upon said cylindrical bearing, a counterweight on the lower end of said holder for supporting the oil-cup in an upright position, and a tube secured at one end to said holder in communication with the feeding-passage of the oil-cup and projecting at the other end loosely into the aperture in the end of said hollow support, substantially as and for the purposes set forth.

3. In a gravity center-oiler the combination with a suitable oil-cup provided with a perforated threaded neck or plug at the base, a tubular or hollow revolving or oscillating bearing-support therefor provided with a central contracted aperture in one end and connected by a tubular arm with the end of a crank or wrist pin, a holder formed in the upper end with a threaded socket for the reception and attachment of the threaded neck of said oil-cup and provided with a sleeve fitted loosely upon said bearing-support, a counterweight on the lower end of said holder for supporting the oil-cup in an upright position, and a tube secured at one end in said holder in communication with the feeding-passage of said oil-cup and projecting at its other end into the aperture in the end of said bearing-support, substantially as and for the purposes set forth.

4. In a gravity center-oiler the combination with a counterweighted oil-cup provided with a bearing-sleeve, of a hollow journal upon which said bearing-sleeve is mounted and in which it is free to turn, a tube leading from the feed-passage of the oil-cup and projecting loosely into a contracted aperture in the end of said hollow journal, a tubular arm attached radially at one end to said hollow journal and provided at the other end with an inwardly-recessed sleeve parallel with said hollow journal, and a tubular screw-threaded plug fitted in said sleeve and adapted to be screwed into a socket in the end of a crank or wrist pin, substantially as and for the purposes set forth.

5. In a gravity center-oiler the combination with a counterweighted oil-cup provided with a bearing-sleeve, of a hollow journal upon which said sleeve is loosely mounted, a tube leading from the feed-passage of said oil-cup into a contracted central aperture in said journal, a tubular arm attached radially at one end to said journal, an internally-recessed sleeve attached to the other end of said tubular arm parallel with said hollow journal and provided with a flange or ear and a screw for attachment to the end of a crank or wrist pin, and a tubular screw-threaded plug fitted in said sleeve and adapted to be screwed into a socket in the end of said crank or wrist pin, substantially as and for the purposes set forth.

In witness whereof I hereto affix my signature in presence of two witnesses.

WM. WASHBURN NUGENT.

Witnesses:
LOUIS CHAS. ARNOLD,
LADIMIR RALPH CHAPEK.